Jan. 24, 1961         C. BRYNKO         2,969,330
OIL CONTAINING CAPSULES AND METHOD OF MAKING THEM
Filed June 4, 1958                          2 Sheets-Sheet 1

FIG. 1

DISSOLVE OIL-SOLUBLE MONOMER OF MATERIAL POLYMERIZABLE TO A SOLID, IN AN OIL IN WHICH THE SOLID POLYMER OF THE MATERIAL IS INSOLUBLE.

↓

DISPERSE THE MONOMER-OIL SOLUTION IN A POLAR LIQUID TO FORM DROPLETS.

↓

POLYMERIZE THE MONOMER IN THE DISPERSED DROPLETS TO FORM A POLYMERIZED SOLID CAPSULE WALL AROUND EACH OF THE MONOMER-OIL DROPLETS.

FIG. 2

PREPARE A SOLUTION OF AN OIL, A MONOMER MATERIAL POLYMERIZABLE TO A SOLID WHICH IS INSOLUBLE IN THE OIL, AND A CATALYST.

↓

HEAT THE SOLUTION SUFFICIENTLY TO INITIATE POLYMERIZATION.

↓

DISPERSE THE HEATED SOLUTION, AS DROPLETS, IN A POLAR LIQUID.

↓

HEAT THE DISPERSION TO COMPLETE POLYMERIZATION OF THE MONOMER MATERIAL TO FORM A POLYMERIZED SOLID CAPSULE WALL AROUND EACH OF THE OIL DROPLETS.

INVENTOR
CARL BRYNKO

BY
HIS ATTORNEYS

Jan. 24, 1961    C. BRYNKO    2,969,330
OIL CONTAINING CAPSULES AND METHOD OF MAKING THEM
Filed June 4, 1958    2 Sheets-Sheet 2

FIG. 3

PREPARE A SOLUTION OF AN OIL AND AN OIL-SOLUBLE MONOMER POLYMERIZABLE TO A SOLID WHICH IS INSOLUBLE IN THE OIL.

↓

DISPERSE THE OIL-MONOMER SOLUTION, AS DROPLETS, IN A POLAR LIQUID BATH CONTAINING A CATALYST.

↓

HEAT THE DISPERSION, CONTAINING THE MONOMER AND CATALYST, TO POLYMERIZE THE MONOMER WHICH DEPOSITS AS SOLID POLYMER MATERIAL WALLS AROUND EACH DROPLET TO FORM CAPSULES.

FIG. 4

PREPARE A SOLUTION OF AN OIL, A MONOMER MATERIAL POLYMERIZABLE TO A SOLID WHICH IS INSOLUBLE IN THE OIL, AND A CATALYST.

↓

HEAT THE SOLUTION SUFFICIENTLY TO INITIATE POLYMERIZATION.

↓

DISPERSE THE HEATED SOLUTION, AS DROPLETS, IN A POLAR LIQUID CONTAINING A CATALYST.

↓

HEAT THE DISPERSION INCLUDING CATALYST IN THE DROPLETS AND CATALYST IN THE POLAR LIQUID TO POLYMERIZE THE MONOMER WHICH DEPOSITS AS SOLID POLYMER MATERIAL WALLS AROUND EACH DROPLET TO FORM CAPSULES.

INVENTOR
CARL BRYNKO

BY  *Louis A. Kline*
    *Justin ...*
HIS ATTORNEYS

United States Patent Office

2,969,330
Patented Jan. 24, 1961

2,969,330
OIL CONTAINING CAPSULES AND METHOD OF MAKING THEM

Carl Brynko, Dayton, Ohio, assignor to The National Cash Register Company, Dayton, Ohio, a corporation of Maryland Filed June 4, 1958, Ser. No. 739,716

8 Claims. (Cl. 252—316)

This invention relates to a process for making minute substantially spherical individual pressure-rupturable, oil-containing capsules and to capsules made thereby, and more particularly pertains to such a process and capsules, preferably of microscopic size, in which the capsule walls are of solid artificial polymer material formed of polymerized monomer material.

In the novel process at least one selected monomer material, which is polymerizable to a solid, is dissolved in an oil in which the solid polymer material is insoluble. By "oil" is meant a water-immiscible liquid and may consist of a mixture of different kinds of water-immiscible liquids. The solution then is dispersed as droplets in a polar liquid, such as water, where polymerization of the monomer material takes place under the influence of a catalyst which either has been introduced into the oil, into the monomer material before solution, into the monomer solution, into the polar liquid, or into the dispersion.

The polymer material, the formation of which is induced by catalyzation, deposits at the interface of the oil droplets and polar liquid, because it is insoluble in the oil, and thus forms an individual solid wall around each oil droplet, resulting in discrete pressure-rupturable, substantially spherical, oil-containing capsules.

After the capsules have been formed by the novel process, the residual polar liquid may be removed to leave the capsules as apparently dry entities but which, nevertheless, contain oil, which oil may be released by rupture of the capsule walls.

The oil contained in the capsules, which may constitute up to as much as 90 percent, by volume, of the capsules, may be animal, vegetable, mineral, or artificial, providing that the monomeric material is soluble therein, at the temperature of dispersion, and becomes insoluble therein on being polymerized. Among the many oils, which can be used in the process, may be mentioned sperm oil, lard oil, olive oil, coconut oil, castor oil, cottonseed oil, kerosene, xylene, petroleum lubricating oils, chlorinated diphenyl, and methyl salicylate. These oils may have dissolved or dispersed therein dyes, inks, perfumes, adhesives, medicines, chemical reactants, and many other things that need physical protection against deterioration, evaporation, handling pressures, and the like.

In the event the capsules carry an oily printing ink, the polar liquid carrying the capsules may be coated on paper and dried, leaving a transfer coating of capsules which may be ruptured by marking pressures to release the printing ink so as to be transferable to a copy-receiving sheet, as set forth in United States Patent No. 2,730,456, which issued on the application of Barrett K. Green and Lowell Schleicher on January 10, 1956, said patent relating to pressure-rupturable hydrophilic colloid walled capsules.

Although emulsification is the most efficient way to form the oil droplets in the polar liquid, which droplets necessarily will be microscopic, the oil solution may be introduced into the polar liquid as larger droplets, by a dripping or spraying process to form macroscopic capsules by subsequent polymerization.

With these and other objects in view, the invention will be described with reference to the drawings.

Of the drawings, which are flow charts of the process:

Fig. 1 is a flow chart of the process of the invention in broad terms;

Fig. 2 is a flow chart of that species of the process in which a polymerizing catalyst is introduced into the oil-monomer solution before dispersion of the solution in the polar liquid;

Fig. 3 is a flow chart of that species of the process in which the polymerizing catalyst is introduced into the polar liquid before the monomer-containing oil is dispersed therein; and Fig. 4 is a flow chart of that species of the process in which the polymerizing catalyst is present in both the oil-monomer solution and in the polar liquid.

*General description*

Minute capsules as made by the process described herein may be macroscopic, or large enough to be seen by the unaided eye, that is, up to several millimeters in greatest dimension, or, on the other hand, microscopic, with greatest dimension of several microns, or any dimension in between. The term "dispersion," as used herein, is meant broadly to cover both macroscopic oil droplets and microscopic oil droplets distributed in a polar liquid.

The microscopic droplets are easily made, by emulsion techniques by aid of an emulsifying agent, and the preferred embodiment will be described with reference to the making of microscopic capsules. The macroscopic droplets, as has been said, can be made by spraying or dripping techniques. In both instances, a polar liquid is used as the environment for holding the oil droplets as individual entities while they are encapsulated by the solid polymer material. As the oil droplets are dispersed in a liquid they are substantially spherical and determine the final shape of the individual capsules.

As a preferred embodiment there will be described the formation of microscopic capsules having pressure-rupturable capsule walls, each capsule containing a droplet of oil in which is dissolved a colorless color-reactant, 3,3 bis (p-dimethylamino) 6-dimethylamino phthalide, known as "crystal violet lactone," which is described in United States Patent Re. 23,024, which issued August 17, 1948, on the application of Clyde S. Adams, and also in the beforementioned United States Patent No. 2,730,456. An external phase polar bath is prepared by dissolving 5 grams of gum arabic, as an emulsifying agent, in 500 milliliters of water, as the polar liquid. Into this external phase is emulsified an internal phase consisting of 78 percent, by weight, of dichlorodiphenyl in which is dissolved 20 percent, by weight, of a solution of styrene monomer and divinyl benzene in a ratio of 10 to 1, 2 percent, by weight, of crystal violet lactone, and 35 mgm. of benzoyl peroxide as a catalyst, said internal phase being heated before emulsification to a temperature of approximately 55 degrees centigrade for a period of 15 to 20 minutes to initiate polymerization, said heating of the internal phase and initiation of the polymerization of the monomer material before emulsification aiding in the encapsulation of the oil droplets in the emulsion which is brought to a conclusion by heating the emulsion to approximately 55 degrees centigrade at which temperature it is kept for approximately 4 hours, with constant stirring.

At the conclusion of the polymerization, at the end of the heating of the emulsion, the capsules have been formed and are suspended in a residual liquid which is practically all water.

If paper is to be coated with the, now, pressure-rupturable capsules, the suspension may be coated directly thereon in the heated condition or at room temperature, and dried. If it is desired to store the capsules dry without applying them to paper, the water may be removed by filtering or evaporation, or both. In the present embodiment, the gum arabic used as an emulsifying agent also acts as a binder to hold the capsules to the paper, if so used while in the dispersed state while the gum arabic is tacky.

In the preferred example, water has been specified as the polar liquid although equivalents can be used, among which may be mentioned ethylene glycol, glycerine, ethanol, and methanol.

Gum arabic was chosen as the emulsifying agent as it is tacky in water and provides an adhesive characteristic for application of the capsules to paper or other transfer web. Other oil-in-water emulsifying agents may be used in place of gum arabic, as, for instance, sodium myristate, sorbitan monolaurate, sorbitan monopalmitate, sodium alkyl sulfates, and the like.

The dichlorodiphenyl was selected as being non-volatile, and a good solvent for the crystal violet lactone, but many other oils could be used, such as petroleum fractions of the desired viscosity, dibutyl phthalate, cottonseed oil, lard oil, and, generally, those heretofore named.

As color reactants to substitute for crystal violet lactone may be mentioned malachite green lactone, benzoyl leuco methylene blue and others found and described in United States Patent No. 2,548,366, which issued April 10, 1951, on the application of Barrett K. Green and Robert W. Sandberg.

As oil-soluble dyes which have an intrinsic color, and which can be used, may be mentioned crystal violet, Sudan III, azo-blue black, and nigrosine.

In another embodiment of the invention, instead of having an oil-soluble material in the internal oil phase, a dispersed solid may be used, such as carbon black, which is small enough in particle size to stay in suspension until encapsulation. Up to 30 percent, by weight, of the carbon black may be used with respect to the oil, and by its intrinsic color acts as an ink. As a specific example, 20 grams of carbon black, 20 grams of a 10 to 1 mixture of styrene-divinyl benzene monomer, and ½ gram of benzoyl peroxide is mixed in 60 grams of dichlorodiphenyl, and the mixture is heated at 80 degrees centigrade for 10 minutes to initiate polymerization by activating the catalyst. This constitutes the internal phase which is emulsified into an external phase consisting of 500 milliliters of water in which is dissolved ½ gram of potassium persulfate and 1½ grams of gum arabic. The emulsion is heated at 80 degrees centigrade for 6 hours with stirring to complete the polymerization. The capsules thus formed are dispersed in the residual liquid and are used as desired either in the dispersed state or dried, as explained with reference to the first and preferred embodiment. If desired, finely divided ultramarine blue pigment or equivalent colored pigments or mixtures thereof may be substituted for the carbon black.

So far the examples given have specified certain monomers, certain catalysts, and a certain oil. As equivalent monomers to be used in the internal phase may be mentioned ethyl acrylate, methyl acrylate, methyl methacrylate, ethyl methacrylate, and vinyl acetate, although there are many others. Oils equivalent to dichlorodiphenyl have been mentioned.

Among catalysts which may be used as substitutes for those already mentioned are acetyl peroxide, di-tertiary-butyl peroxide, alpha-alpha-azo-di-isobutyrontile, hydrogen peroxide, calcium peroxide, zinc peroxide, and sodium pyrophosphate peroxide. The catalyst or catalysts used, as they may be mixed, may be oil soluble, water soluble, or insoluble in oil or water, as they will eventually end up at the interfaces between the oil droplets and the polar liquid to effect their purpose.

It will be apparent that the ingredients named in the specific examples, and the equivalents set forth are not to be deemed to limit the invention which will be described in the claims to follow.

What is claimed is:

1. The method of making capsules, consisting of the steps of providing an oil in which there is dissolved at least one monomer material which is polymerizable to a solid, the material after it is polymerized being insoluble in the oil; dispersing the monomer-containing oil in a polar liquid to form droplets; and causing polymerization of the material, which material when polymerized and thus rendered insoluble moves to the interfaces between the droplets and the polar liquid, whereby to form a separate encapsulating wall of solid polymer material around each droplet of oil.

2. The method of making capsules, consisting of the steps of providing a solution including at least one oil, as a solvent, and at least one monomer material, polymerizable to a solid, dissolved in said solvent, the material after it is polymerized being insoluble in the solvent; dispersing the monomer-containing solution in a polar liquid to form droplets; and causing polymerization of the material, which polymerized material thus being rendered solid and insoluble moves to the interfaces between the droplets and the polar liquid, whereby to form a separate encapsulating wall of solid polymer material around each droplet of oil.

3. The process of making discrete, pressure-rupturable capsules, each containing oil, including the steps of dissolving an oil-soluble monomer material, polymerizable to a solid, in an oil, to form an oil-monomer solution, the monomer and oil being selected so the polymer of said monomer is insoluble in the oil; providing a polar liquid; providing a catalyst in at least one of the foregoing ingredients, the catalyst normally being inactive, but activatable to polymerize the monomer; dispersing the oil solution as droplets in the polar liquid; and activating the catalyst to polymerize the monomer, the polymer being produced in each oil droplet, because of its insolubility, moving to the interface between the oil and the polar liquid to form a pressure-rupturable capsule wall which retains the enclosed oil until ruptured.

4. The process of making discrete, pressure-rupturable capsules, each containing oil, including the steps of dissolving an oil-soluble monomer material, polymerizable to a solid, in an oil, to form an oil-monomer solution, the monomer and oil being selected so the polymer of said monomer is insoluble in the oil; providing a catalyst in at least one of the foregoing ingredients, the catalyst normally being inactive, but activatable to polymerize the monomer; providing a polar liquid; dispersing the catalyst-containing oil-monomer solution in the polar liquid as droplets; and activating the catalyst to polymerize to a solid the monomer in the droplets, the solid polymer being produced in each droplet of oil moving to the interface between the oil and the polar liquid to form a pressure-rupturable capsule wall which retains the enclosed oil until ruptured.

5. The process of making discrete, pressure-rupturable capsules, each containing oil, including the steps of dissolving an oil-soluble monomer material, polymerizable to a solid, in an oil, to form an oil-monomer solution, the monomer and oil being selected so the polymer of said monomer is insoluble in the oil; providing a polar liquid; introducing an inactive, but activatable catalyst into the polar liquid; dispersing the oil-monomer solution as droplets in the catalyst-containing polar liquid; and activating the catalyst to polymerize to a solid the monomer in the droplets, the solid polymer being produced in each droplet of oil migrating to the interface between the oil and the polar liquid to form a pressure-rupturable capsule wall which retains the enclosed oil until ruptured.

6. The process of making discrete, pressure-rupturable capsules, each containing oil, including the steps of dissolving an oil-soluble monomer material, polymerizable to a solid, in an oil, to form an oil-monomer solution, the monomer and oil being selected so the polymer of said monomer is insoluble in the oil; providing a polar liquid; dispersing the oil-monomer solution as droplets in the polar liquid; and polymerizing the monomer in the droplets by catalytic action, the solid polymer being produced in each droplet migrating to the interface between the oil and the polar liquid to form a pressure-rupturable capsule wall which retains the enclosed oil until ruptured.

7. The process of making capsules having walls of polymerized monomer material, each of the capsules containing oil, including the steps of providing an oil to be encapsulated; introducing a monomer, which is polymerizable to a solid, into the oil, the monomer being soluble in the oil but the polymer thereof not being soluble in the oil; providing a polar liquid bath in which the oil may be dispersed; providing a heat-activatable catalyst which is introduced into any of the foregoing ingredients; dispersing the monomer-oil solution in the polar liquid; and causing activation of the catalyst by heat and consequent polymerization of the monomer after introduction of the catalyst, and dispersion of the oil-monomer dispersion, whereby the oil is encapsulated as droplets within individual polymer walls.

8. Capsules made according to the process of claim 6.

References Cited in the file of this patent

UNITED STATES PATENTS

| | | |
|---|---|---|
| 1,134,156 | Planten | Apr. 6, 1915 |
| 1,690,760 | Volwiler | Nov. 6, 1928 |
| 2,730,456 | Green et al. | Jan. 10, 1956 |
| 2,732,351 | Clarke | Jan. 24, 1956 |
| 2,800,457 | Green et al. | July 23, 1957 |
| 2,800,458 | Green | July 23, 1957 |

UNITED STATES PATENT OFFICE
CERTIFICATION OF CORRECTION

Patent No. 2,969,330                                January 24, 1961

Carl Brynko

It is hereby certified that error appears in the above numbered patent requiring correction and that the said Letters Patent should read as corrected below.

Column 3, line 72, for "alpha-alpha-azo-di-isobutyrontile" read -- alpha-alpha-azo-di-isobutyronitrile --.

Signed and sealed this 6th day of June 1961.

(SEAL)
Attest:

ERNEST W. SWIDER
Attesting Officer

DAVID LADD
                                                     Commissioner of Patents